United States Patent
Hamlin et al.

(10) Patent No.: US 11,294,054 B2
(45) Date of Patent: *Apr. 5, 2022

(54) INFORMATION HANDLING SYSTEM INFRARED PROXIMITY DETECTION WITH AMBIENT LIGHT MANAGEMENT

(71) Applicant: Dell Products L.P., Round Rock, TX (US)

(72) Inventors: Daniel L. Hamlin, Round Rock, TX (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 257 days.

This patent is subject to a terminal disclaimer.

(21) Appl. No.: 16/599,224

(22) Filed: Oct. 11, 2019

(65) Prior Publication Data
US 2021/0109213 A1    Apr. 15, 2021

(51) Int. Cl.
*G01S 17/04*    (2020.01)
*G01J 1/42*    (2006.01)
(Continued)

(52) U.S. Cl.
CPC ............ *G01S 17/04* (2020.01); *G01J 1/0238* (2013.01); *G01J 1/1626* (2013.01);
(Continued)

(58) Field of Classification Search
CPC ........ G01S 17/04; G01S 17/08; G01J 1/0238; G01J 1/1626; G01J 1/4204; G01J 5/60;
(Continued)

(56) References Cited

U.S. PATENT DOCUMENTS 7,714,265 B2    5/2010 Fadell et al.
8,363,098 B2    1/2013 Rosener et al.
(Continued)

FOREIGN PATENT DOCUMENTS

CA    2027515 A1 *    4/1992    ............ H05B 41/30
CA    2838280    12/2012
(Continued)

OTHER PUBLICATIONS

HuaWei Technologies—WO 2021-047435 A1—Google Patents English Translation obtained Aug. 18, 2021 (Year: 2021).*
(Continued)

*Primary Examiner* — David P Porta
*Assistant Examiner* — Jeremy S Valentiner
(74) *Attorney, Agent, or Firm* — Zagorin Cave LLP; Robert W. Holland

(57) ABSTRACT

An information handling system manages operation of an infrared time of flight sensor to provide accurate and timely user presence and absence detection through adjustments of the time of flight sensor detection sensitivity based upon ambient light brightness and color temperature sensed by an ambient light sensor. An integrated sensor hub in a central processing unit disables infrared illumination by the time of flight sensor, senses ambient light conditions with the ambient light sensor, looks up sensitivity settings from a lookup table that associates infrared time of flight sensor sensitivity and ambient light conditions, applies the associated sensitivity at the infrared time of flight sensor and then re-enables infrared illumination to detect end user presence and absence with the infrared time of flight sensor.

19 Claims, 4 Drawing Sheets

(51) Int. Cl.
| | |
|---|---|
| *G01J 1/02* | (2006.01) |
| *G01J 1/16* | (2006.01) |
| *G01J 5/60* | (2006.01) |
| *G05B 13/02* | (2006.01) |
| *G06F 1/3231* | (2019.01) |
| *G01S 17/08* | (2006.01) |

(52) U.S. Cl.
CPC ............... *G01J 1/4204* (2013.01); *G01J 5/60* (2013.01); *G01S 17/08* (2013.01); *G05B 13/0265* (2013.01); *G06F 1/3231* (2013.01); *G01N 2223/506* (2013.01)

(58) Field of Classification Search
CPC .............. G05B 13/0265; G06F 1/3231; G01N 2223/506
See application file for complete search history.

(56) References Cited

U.S. PATENT DOCUMENTS

| | | | |
|---|---|---|---|
| 8,593,277 | B2 | 11/2013 | Nath et al. |
| 8,760,631 | B2 | 6/2014 | Ritter et al. |
| 9,378,342 | B2 | 6/2016 | Robison et al. |
| 9,672,627 | B1 | 6/2017 | Ramaswamy |
| 2007/0139392 | A1 | 6/2007 | Kim |
| 2011/0310005 | A1* | 12/2011 | Chen ...................... G06F 3/017 345/156 |
| 2013/0346084 | A1 | 12/2013 | Archambault et al. |
| 2014/0085221 | A1 | 3/2014 | Kim |
| 2014/0215248 | A1 | 7/2014 | Cheng |
| 2015/0085060 | A1 | 3/2015 | Fish |
| 2016/0127765 | A1 | 5/2016 | Robinson |
| 2017/0205876 | A1 | 7/2017 | Vidal |
| 2018/0275752 | A1 | 9/2018 | Peterson |
| 2018/0321731 | A1 | 11/2018 | Alfano et al. |
| 2019/0034609 | A1 | 1/2019 | Yang |
| 2020/0142471 | A1* | 5/2020 | Azam ..................... G06F 21/32 |
| 2020/0373810 | A1 | 11/2020 | Channaiah |

FOREIGN PATENT DOCUMENTS

| | | | |
|---|---|---|---|
| CN | 103347437 | 10/2013 | |
| EP | 2472424 | 7/2012 | |
| WO | WO-2021047435 A1 * | 3/2021 | ............ G06F 21/32 |

OTHER PUBLICATIONS

Pidgeon, Elana, "Windows 10 Tip: How to Enable Focus Assist in the Windows Apr. 10, 2018 Update," downloaded from https://blogs.windows.com/windowsexperience/2018/05/09/windows-10-tip-how-to-enable-focus-assist-in-the-windows-10-april-2018-update/ Feb. 28, 2020, 7 pages.

Reddit, "Windows 10" Comments downloaded from https://www.reddit.com/r/Windows10/comments/9d7ohc/notifications_are_queued_up_and_displayed_in/ on Feb. 28, 2020, 2 pages.

U.S. Appl. No. 16/599,220, filed Oct. 11, 2019, entitled "Information Handling System Proximity Sensor with Mechanically Adjusted Field of View" to Inventors Daniel L. Hamlin et al.

U.S. Appl. No. 16/419,779, filed May 22, 2019, entitled "Augmented Information Handling System User Presence Detection" to Inventors Daniel L. Hamlin et al.

U.S. Appl. No. 16/599,222, filed Oct. 11, 2019, entitled "Information Handling System Infrared Proximity Detection with Distance Reduction Detection" to Inventors Daniel L. Hamlin et al.

U.S. Appl. No. 16/599,226, filed Oct. 11, 2019, entitled "Information Handling System Infrared Proximity Detection with Frequency Domain Modulation" to Inventors Daniel L. Hamlin et al.

U.S. Appl. No. 16/778,787, filed Jan. 31, 2020, entitled "Information Handling System Notification Presentation Based Upon User Presence Detection" to Inventors Daniel L. Hamlin et al.

U.S. Appl. No. 16/778,798, filed Jan. 31, 2020, entitled "Information Handling System Peripheral Enhanced User Presence Detection" to Inventors Daniel L. Hamlin et al.

U.S. Appl. No. 16/778,805, filed Jan. 31, 2020, entitled "Information Handling System Adaptive User Presence Detection" to Inventors Daniel L. Hamlin et al.

* cited by examiner

INFORMATION HANDLING SYSTEM INFRARED PROXIMITY DETECTION WITH AMBIENT LIGHT MANAGEMENT

BACKGROUND OF THE INVENTION

Field of the Invention

The present invention relates in general to the field of information handling system presence detection, and more particularly to an information handling system infrared proximity detection with ambient light management.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems generally process information with processing components disposed in a housing and present the information at a display. Desktop information handling systems typically present information as visual images at a peripheral display and accept end user inputs through peripheral input/output (I/O) devices, such as a keyboard and/or mouse. Portable information handling systems typically integrate a display and I/O devices into a portable housing along with a power source, such as a rechargeable battery. Generally, information handling systems include some sort of logic to power down a display if an end user is not viewing presented visual images. Powering down a display reduces power consumption, which increases battery life of portable systems, and increases security by enforcing password protection before again presenting visual images and permitting access to processing resources through I/O devices. Typical "screensaver" logic powers down a display and locks an information handling system after a preset timeout expires without an end user interaction. Generally, once a timeout expires an end user has to make an input at an I/O device to wake the system to input a password. Although this logic tends to save power and increase security, use of a hard timeout means that an end user has to balance the length of the timeout with the inconvenience of interruptions to system use. A typical screensaver timeout of fifteen minutes leaves a considerable window of non-use during which power is consumed and unauthorized access is available.

To provide improved power management and security, a variety of Human Presence Detection (HPD) sensors have been developed. One promising HPD sensor is an infrared time of flight (IRTOF) sensor. IRTOF sensors illuminate an area where an end user is expected, such as in front of a display that presents visual images, with an infrared light source and detects objects based upon time of flight of infrared reflections detected at the sensor. For instance, the IRTOF sensor scans the IR light source as a narrow beam across plural sectors to detect changes in distance to objects in each sector so that a detected object that moves over time indicates a human presence. IRTOF sensors provide a high degree of accuracy and sensitivity so that a very rapid response to user absence and presence is provided. Thus, as long as the IRTOF sensor detects an end user in the field of view, the system will not timeout so that the end user's viewing is not interrupted. If the IRTOF sensor fails to detect an end user in the field of view, a very rapid timeout may be enforced since the IRTOF sensor tends to have an accurate and rapid user absence detection. An aggressive timing configuration that quickly turns off a display and locks a system at user absence detection tends to decrease power consumption and increase system security.

One difficulty with IRTOF sensors is that rapid and highly sensitive detection of presence and absence risks the application of false user absence detections that result in end user interruptions of system use. Although IRTOF sensors are highly sensitive and accurate, variations in operating conditions can result in false user absent indications. For example, external sources of infrared light, such as ambient light levels and industrial point light source, can interfere with IRTOF sensor resolution resulting in false absent or false present indications. To avoid such interference, IRTOF sensors typically include a calibration process run at start-up that detects operating conditions and adjusts present and absent detection levels. For instance, in an environment having high levels of infrared interference, IRTOF sensors tend to have shorter detection ranges and less accuracy. The calibration process may include selection of an infrared frequency by the IRTOF sensor that provides reduced interference. A difficulty with such calibration is that environmental conditions change during information handling system operations, which can introduce variations in IRTOF sensor accuracy.

SUMMARY OF THE INVENTION

Therefore, a need has arisen for a system and method which adapts IRTOF sensor operations at an information handling system for improved end user presence and/or absence detection accuracy based upon ambient light conditions.

In accordance with the present invention, a system and method are provided which substantially reduce the disadvantages and problems associated with previous methods and systems for managing an IRTOF sensor at an information handling system to detect end user presence and/or absence. Ambient light conditions, such as ambient light brightness and color temperature sensed by an ambient light sensor, is applied by an information handling system to adjust IRTOF sensor sensitivity to provide more timely and accurate end user absence and presence detection indications.

More specifically, an information handling system processes information with a processor and memory for presentation at a display as visual images. An IRTOF sensor monitors a zone at the display associated with end user presence and absence and reports a presence or absence state to a proximity detection application running on the information handling system through a hardware and operating system interface, such as an integrated sensor hub that interfaces with an operating system driver. To avoid false user absence report disruption of end user interactions with the information handling system, the proximity detection application validates IRTOF sensor results by reference to ambient light conditions retrieved from an ambient light sensor and applied to adjust a sensitivity of the IRTOF sensor. For instance, an integrated sensor hub of a processor receives ambient light sensor brightness and color temperature from an ambient light sensor and looks up sensitivity settings in a lookup table that associates ambient light conditions with IRTOF sensor sensitivity settings. The integrated sensor hub then commands the IRTOF sensor to apply the sensitivity settings to determine user presence and absence. In one embodiment, the integrated sensor hub commands the IRTOF sensor to cease illumination of infrared light while ambient light conditions are sensed. In another embodiment, the integrated sensor hub ceases monitoring of presence and/or absence detection by the IRTOF sensor when ambient light brightness and/or color temperature exceeds a threshold. In an alternative embodiment, the integrated sensor hub commands the IRTOF sensor to autonomously determine sensitivities when ambient light falls within predetermined ranges. Integrated sensor hub adjustments to IRTOF sensor threshold may directly command IRTOF sensor sensitivity levels or command incremental changes to autonomously determined sensitivity levels.

The present invention provides a number of important technical advantages. One example of an important technical advantage is that an IRTOF sensor provides more reliable and timely transitions between end user presence and absence indications that manage presentation of visual images by and access to an information handling system. By applying ambient light conditions sensed by an ambient light sensor to look up sensitivity settings of the IRTOF sensor, the reliability of the IRTOF sensor is improved for detection of user absence and presence detection. System level management of the IRTOF sensor from an integrated sensor hub adapts operation of the IRTOF sensor to ambient light conditions that impact IRTOF sensor operations in a manner not directly detectable at the IRTOF sensor itself. The integrated sensor hub sets IRTOF sensitivity during predetermined ambient light conditions ranges of brightness and/or color temperature by reference to a lookup table that stores the sensitivity settings or incremental changes to autonomously selected sensitivity settings. Reliability of IRTOF sensor indications derived at a system level, such as by other indications of end user absence and presence and other indications of infrared interference, provides a basis for machine learning of optimal IRTOF sensitivity adjustments based upon sensed ambient light conditions. Applying external ambient light determinations to fine tune IRTOF sensor operations provides more rapid and accurate indications of user presence and absence at an information handling system with less risk of end user disruptions.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system manages an infrared time of flight (IRTOF) sensor with system commands to validate end user presence and absence detection by adjusting sensitivity of infrared frequency sensing based upon ambient light conditions, such as brightness and color temperature. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
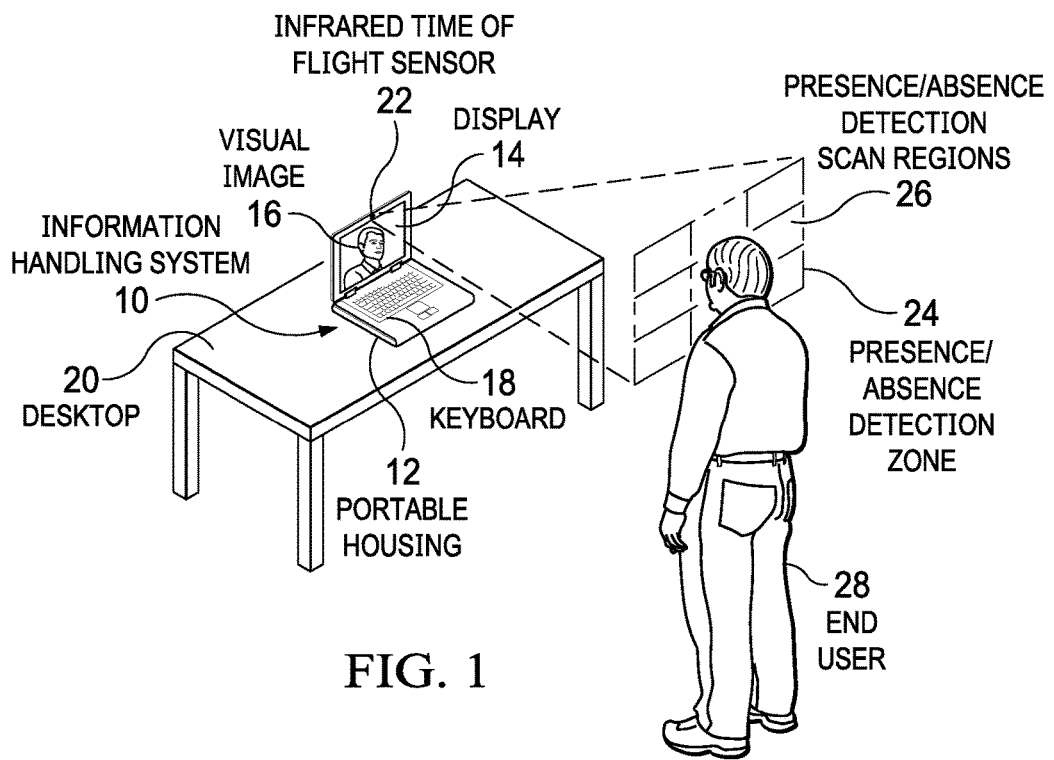
FIG. 1 depicts a portable information handling system monitoring an end user for presence and absence with an infrared time of flight (IRTOF) sensor.

Referring now to FIG. 1, a portable information handling system 10 monitors an end user 28 for presence and absence with an infrared time of flight (IRTOF) sensor 22. Information handling system 10 processes information with processing components disposed in a portable housing 12. In the example embodiment, portable housing 12 has rotationally coupled portions that rotate to a clamshell mode having a display 14 integrated in one housing portion raised to a vertical viewing position to present a visual image 16 over top of a keyboard 18 integrated in a second portion that rests on a desktop 20. End user 28 typically is within a limited distance of portable information handling system 10 when using the system. For instance, to type inputs at keyboard 18, end user 28 is within arm reach; to view visual image 16, end user 28 may have a slightly greater distance, depending on the size of display 14. Although the example embodiment depicts a portable information handling system, alternative embodiments may interact with desktop systems, peripheral displays and televisions.

IRTOF sensor 22 sends pulses of infrared light across a presence/absence detection zone 24 and detects reflections of the infrared light to determine a distance to objects, such as end user 28, within the presence/absence detection zone 24. For instance, IRTOF sensor 22 scans across plural presence/absence detection scan regions 26 in a scan pattern that detects a distance to an object in each region. Over time, animate objects are differentiated from inanimate objects by motion detected with changing distances to the objects in each region. When scan results of IRTOF sensor 22 indicates that a detected object is an end user, a presence detection is provided to the processing components of information handling system 10 so that visual image 16 stays active. When IRTOF sensor 22 indicates that the detected object has left, a user absence indication is provided to the processing components of information handling system 10 so that visual image 16 is removed, such as by powering down display 14. In addition, a user absence indication may be applied by information handling system 10 to lock the system so that it remains secure while end user 28 is not present.

IRTOF sensor 22 provides rapid and accurate user presence and absence detection to reduce power consumption and improve system security, however, if an inaccurate user absence detection is applied as a basis to power down display 14 when an end user is in fact present, the end user's interactions become disrupted. In some instances, IRTOF sensor 22 tends to lose accuracy so that false absence indications applied at information handling system 10 can disrupt end user interactions. For example, interference caused by ambient or point infrared light sources can impact the range and accuracy of IRTOF sensor 22. Generally, IRTOF sensors 22 perform a calibration at power up that attempts to quantify environmental conditions and select an IR frequency from plural available frequencies that will operate most accurately in a sensed environment. In addition, IRTOF sensor 22 adjusts the sensitivity at which it sense infrared reflections based upon the calibration. However, any number of factors can impact such a calibration, such as ambient light conditions or even the color shirt worn by an end user, so that a calibration at start tends to loss effectiveness over time. To maintain accurate user presence and absence detection, information handling system 10 tracks external conditions and adjusts IRTOF sensor 22 infrared sensing so that more accurate and validated user presence and absence are reported.

Figure 2:
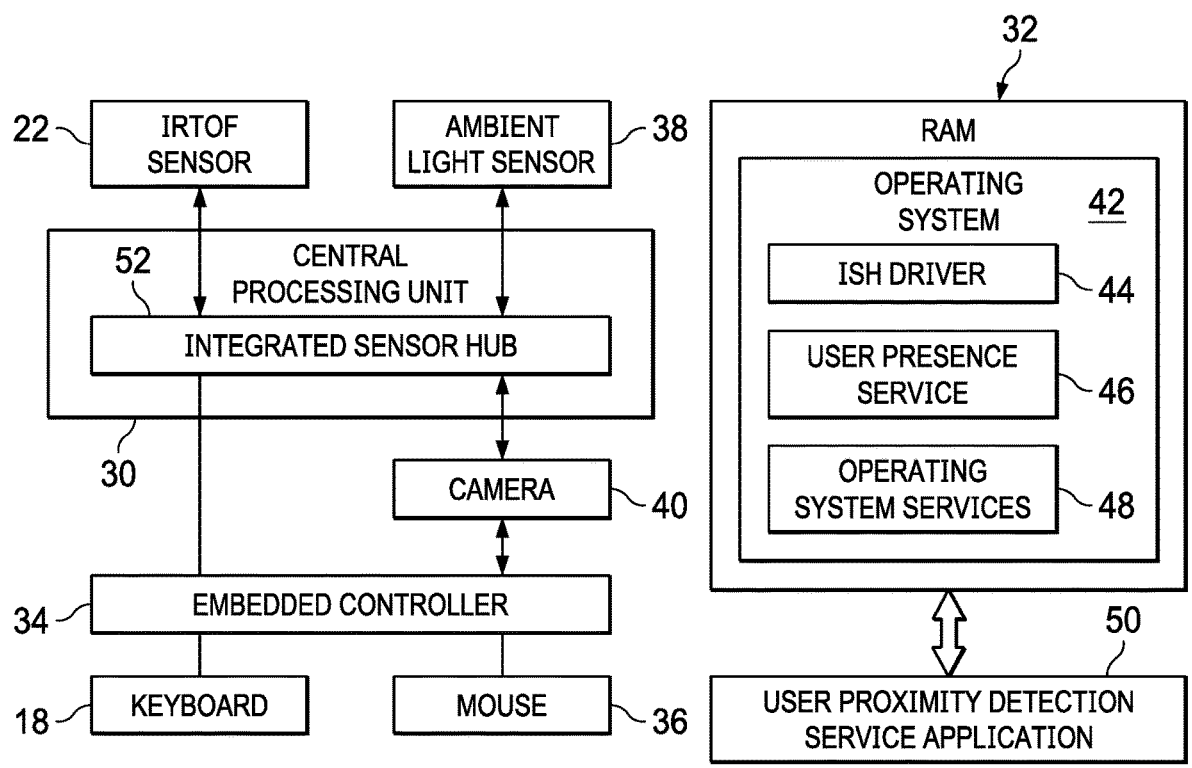
FIG. 2 depicts a block diagram of an information handling system having system level management of IRTOF sensor operations.

Referring now to FIG. 2, a block diagram depicts an information handling system 10 having system level management of IRTOF sensor 22 operations. In the example embodiment, a central processing unit (CPU) 30 executes instructions to process information stored in random access memory (RAM) 32. An embedded controller 34, such as a keyboard controller, manages system operations, such as by applying and removing power at CPU 30 and communicating inputs to CPU 30 from input/output (I/O) devices like keyboard 18 and mouse 36. Various types of peripheral devices and sensors may provide information to CPU 30, such as an ambient light sensor 38, which detects ambient light conditions that impacts display of visual images, and a camera 40, which captures images that may be used to support videoconferencing. In the various embodiments, sensor inputs to CPU 30 may be managed by embedded controller 34 or by sensor functionality integrated within CPU 30, such as the Integrated Sensor Hub (ISH) 52 provided in CPU architectures of INTEL. In the example embodiment, ISH 52 interfaces with and manages IRTOF sensor 22.

End user presence or absence states reported from IRTOF sensor 22 to ISH 52 are managed at a system level by an operating system 42 executing on CPU 30 from RAM 32, such as WINDOWS. In the example embodiment, an ISH driver 44 interfaces with ISH 52 to manage ISH 52 interactions with a user presence service 46 providing the ISH driver 44 with an interface for IRTOF sensor 22. The sensed conditions are provided through operating system services 48 to a user proximity detection service application 50, which applies presence and absence indications of IRTOF sensor 22 to power down a display and lock a system. User proximity detection service application 50 is, for example, installed through operating system 48 to distribute the drivers through the operating system and firmware that manages IRTOF sensor 22. As is set forth in U.S. patent application Ser. No. 16/419,779 by Daniel L. Hamlin; Timothy C. Shaw; Vivek Viswanathan Iyer; Allen B. McKittrick, filed on May 22, 2019, entitled Augmented Information Handling System User Presence Detection, and incorporated herein as if fully set forth, a variety of other factors may also be considered when applying user presence and absence indications, such as inputs made by an end user and other conditions that indicate end user presence and absence.

Figure 3:
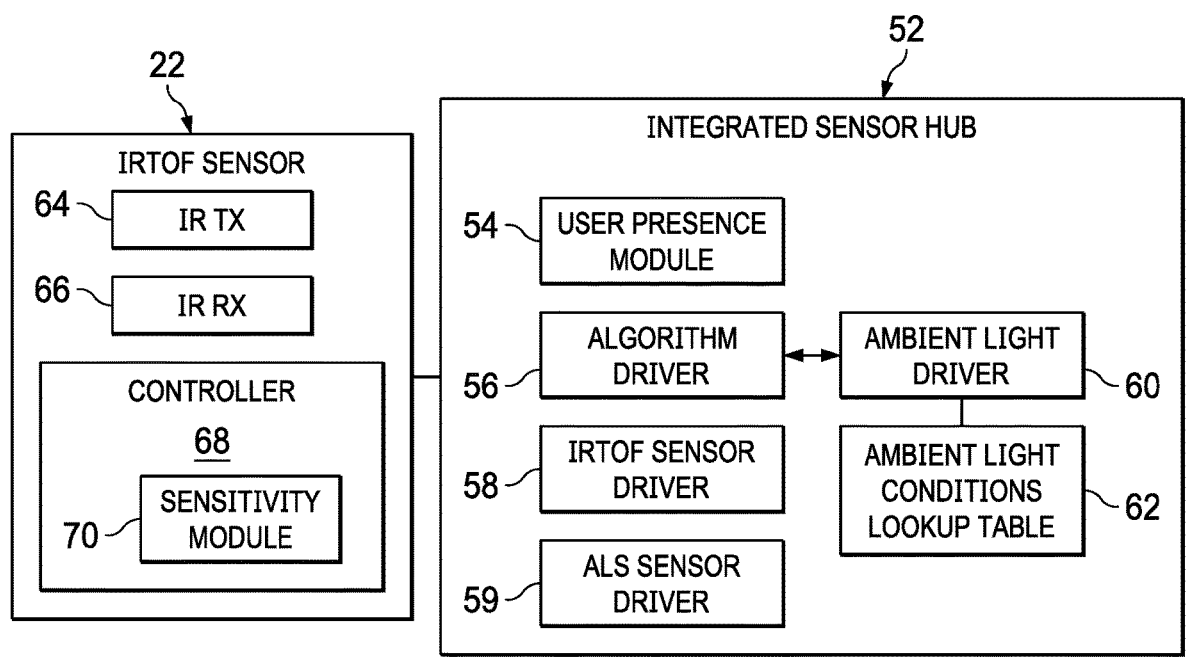
FIG. 3 depicts an example embodiment of logic in an integrated sensor hub that manages IRTOF sensor operations.

Referring now to FIG. 3, an example embodiment depicts logic in an integrated sensor hub 52 that manages IRTOF sensor 22 operations, such as with modules of firmware code stored in flash memory of ISH 52. ISH 52 interfaces with IRTOF sensor 22, such as through an I2C low speed communication link or GPIO, to receive sensed information and configure sensor operations. A sensor driver 58 interfaces with IRTOF sensor 22 to receive data and provides the processed data to an algorithm driver 56 that computes a probability that a user is present and then advertises the results through a user presence module 54 to any subscribed services. IRTOF sensor 22 includes an infrared transmitter (IR TX) 64 that generates infrared illumination and an infrared receiver (IR RX) 66 that receives infrared illumination, including both reflected transmissions of infrared light and interference infrared light from ambient sources. A controller 68 controls IR transmitter 64 and IR receiver 66 to command a scan across a user detection field of view. Controller 68 includes firmware instructions in a sensitivity module 70 that executes to set a sensitivity at IRTOF sensor 22 to detect infrared light as a valid input. For instance, at an initial calibration at system startup, sensitivity module 70 adjusts sensitivity to adapt to environmental conditions. One function of sensitivity module 70 at power up is to test IR RX 66 to determine how different sectors or the IR receiver respond to ambient conditions so that raw signals will provide uniform detection. For example, sensitivity module 70 stores a matrix of sensitivity values that set infrared detection sensitivity in each grid scan.

An ambient light driver 60 executing as a firmware module in ISH 52 interfaces with controller 68 to manage sensitivity settings applied at IRTOF sensor 22 based upon adjustments generated from ambient light sensed by ambient light sensor 38 and provided to integrated sensor hub 52 through an ALS sensor driver 59. Ambient light driver 60 retrieves ambient light conditions from ALS driver 59, such as ambient light brightness and ambient light color temperature, and looks up sensitivity settings associated with the sensed ambient light conditions at an ambient light conditions lookup table 62. Ambient light driver 60 then commands IRTOF sensor 22 sensitivity module 70 to apply the sensitivities for sensing received infrared energy. While IRTOF sensor 22 is active monitoring for absence and presence detection, ambient light driver 60 monitors ambient light conditions reported through ALS sensor driver 59 to adjust IRTOF sensor 22 sensitivity as needed to validate presence and absence detection before reporting to the operating system. Sensitivity settings can take a number of different forms and may involve different applications at IRTOF sensor 22. In one example embodiment, ambient light driver 60 directly commands a sensitivity setting for IRTOF sensor 22 to use in each scan area, such as by sending a matrix with the sensitivity settings to the IRTOF sensor 22. In an alternative embodiment, ambient light driver commands a differential for use in each scan grid, such as an incremental difference from sensitivity settings autonomously determined by sensitivity module 70. In another alternative embodiment, ambient light driver 60 may command sensitivity module 70 to set autonomously determined sensitivities without adjustments based upon detection of ambient light external to IRTOF sensor 22. In another alternative embodiment, ambient light driver 60 may power down IRTOF sensor 22 or ignore presence and/or absence detection by it where ambient light conditions exceed a threshold.

In addition to management of IRTOF sensor 22 with logic embedded in ISH 52, the operating system and applications executing on CPU 30 may provide additional and higher order management logic. For instance, machine learning may monitor IRTOF sensor 22 presence and absence indications for accuracy, such as based on other system inputs, and relate the reliability of presence and absence indications to other factors. In one example embodiment, machine learning determines an optimal set of sensitivity settings by monitoring user presence and absence detection and different ambient light conditions and applied sensitivity settings. In some environments with high reliability, ambient light driver 60 may allow IRTOF sensor 22 to operate autonomously. If the user proximity detection service application detects less optimal conditions, such as based upon an indoor or outdoor location, various ambient light color temperatures and/or brightness, a passive viewing user who consumes presented information without making inputs, or other conditions, it may command ambient light driver 60 to use different sensitivity settings over time in a pattern to validate user absence detection. In such an embodiment, the use of changing sensitivities over time may increase or decrease presence or absence detection reliability as the environmental conditions change allowing for a system specific response to be developed. That is, different condition specific sensitivities may be developed in real time based upon feedback of performance with false detects and false misses. In each example, system level management of IRTOF sensor operations is selectively enforced to optimize user presence and absence detection based upon factors that influence infrared sensor operations and that are not directly discernable at the IRTOF sensor itself.

Figure 4:
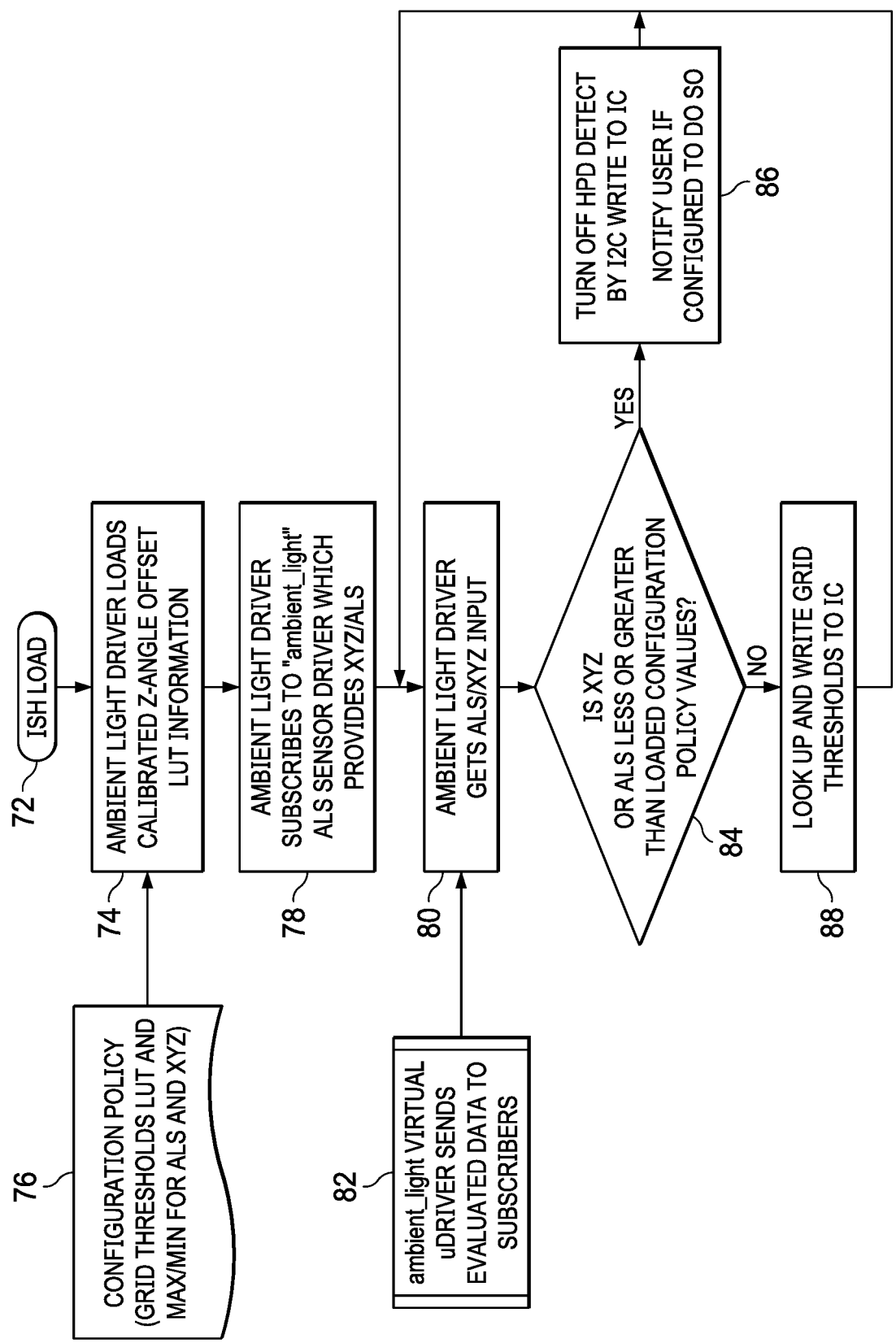
FIG. 4 depicts a flow diagram of a process for managing IRTOF sensor operations at a system level.

Referring now to FIG. 4, a flow diagram depicts a process for managing IRTOF sensor operations at a system level. The process starts at step 72 with loading and execution at ISH 52 of the IRTOF management firmware. At step 74, the ambient light driver loads calibrated offset lookup table information provided from step 76 where the configuration policy having grid thresholds for the lookup table and maximum/minimum ambient light sensor and orientation information is generated. In various embodiments, different types and qualities of ambient light measurements may be sensed and provided to the integrated sensor hub, including sector specific or generalized values of ambient light brightness based upon sensor orientation and ambient light color temperature. Generally, sensed ambient light values are applied to adjust brightness and color temperature at a display to provide the end user with consistent display appearance. To the extent that the IRTOF sensor and ambient light sensor are at different locations and/or axes of orientation, the lookup table includes IRTOF sensor sensitivity settings that are adjusted for variations of sensed ambient light relative to the IRTOF sensor. Once the ambient light driver has the ambient light sensitivity lookup table loaded and accessible, the process continues to step 78 for the ambient light driver to subscribe to the service that provides the ambient light orientation and sensed values. In the example embodiment, an integrated sensor hub of a CPU provides a centralized location for sensors to report and access sensed values, such as ambient light. In alternative embodiments, an embedded controller may execute embedded code that receives and applies sensed ambient light conditions to adjust IRTOF sensor sensitivities.

After setup and initialization of ambient light conditions for managing IRTOF sensitivities, the process continues to step 80 to apply ambient light conditions at the IRTOF sensor. At step 82, the ambient light sensor senses ambient light conditions, such as brightness and color temperature, and provides the ambient light conditions to subscribed services, such as the IRTOF sensor ambient light driver. At step 80, the ambient light driver receives the sensed ambient light and continues to step 84 to determine if the sensed ambient light is greater or less than the configuration values at which ambient light based adjustments to the IRTOF sensor are made. If the sensed ambient light exceeds the configuration values, the process continues to step 86 to turn off the IRTOF human presence detection sensor and provide notice to the end user. In the example embodiment, an I2C command powers down the IRTOF sensor, while alternative embodiments might leave the IRTOF sensor operational but ignore user absence and presence detection until ambient light conditions return to within constraints. In one alternative embodiment, such as where ambient light conditions fall below configured values, the IRTOF sensor may be commanded to autonomously determine its sensitivity without adjustments based upon external sensed ambient light conditions. If at step 84 the ambient light conditions fall within managed values, the process continues to step 88 to lookup IRTOF sensor grid sensitivities based upon the sensed ambient light conditions and write the sensitivity grid to the IRTOF sensor. The process then continues to step 80 to continue monitoring ambient light conditions.

Figure 5:
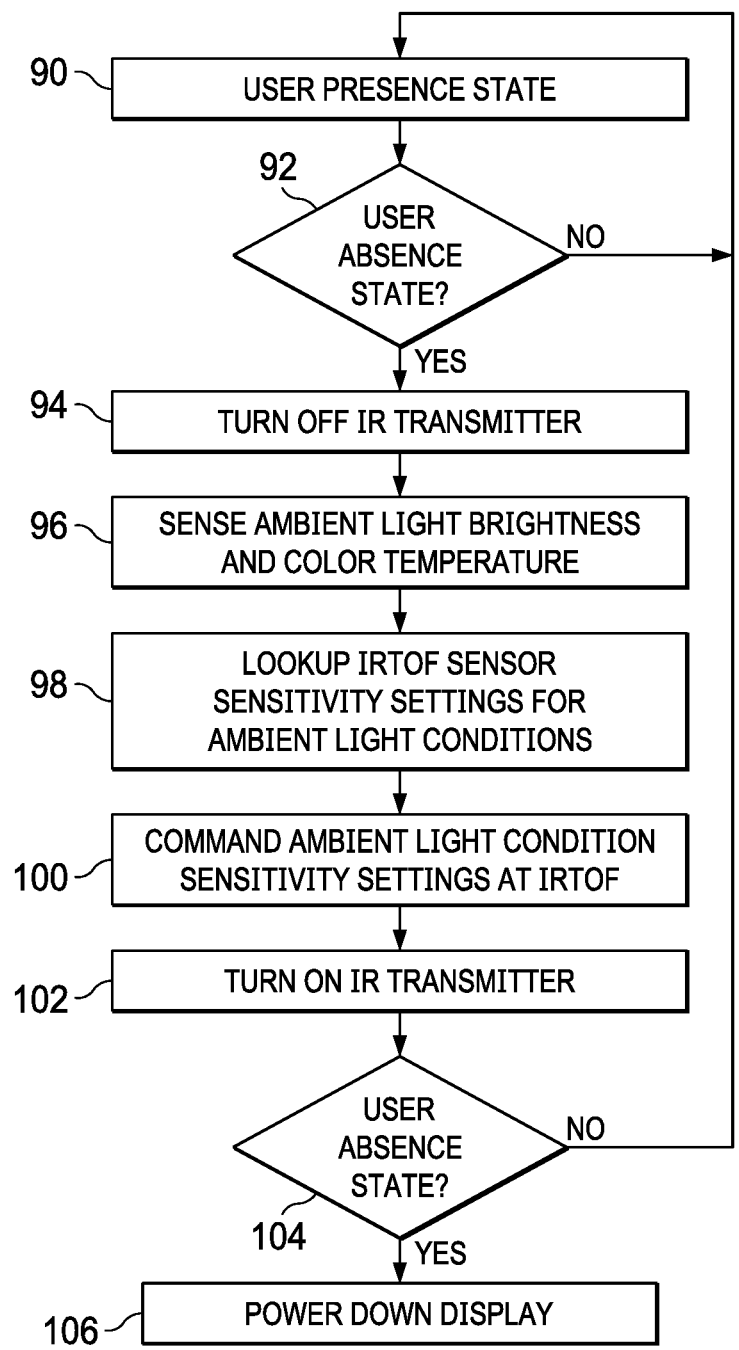
FIG. 5 depicts a flow diagram of a process for altering IRTOF sensitivities to validate end user absence and/or presence detection.

Referring now to FIG. 5, a flow diagram depicts a process for altering IRTOF sensitivities to validate end user absence and presence detection. The process starts at step 90 in a user presence state, such as where the IRTOF sensor detects movement of an object in its field of view that indicates an animate object. At step 92 a determination is made of whether the user presence state has changed to a user absence state, such as due to a lack of detection of an animate object for a predetermined time. If a user presence state remains, the process returns to step 90 to continue monitoring for user absence. If a user absence state is detected, the process continues to step 94 to turn off the IR transmitter of the IRTOF sensor so that it does not interfere with ambient light sensing. At step 96, ambient light conditions are sensed with the ambient light sensor to include ambient light brightness and color temperature. At step 98, a look up is performed in the IRTOF sensor sensitivity settings for the sensed ambient light conditions, such as a grid of sensitivity settings associated with the ambient light brightness and color temperature reported to the integrated sensor hub by the ambient light sensor while the IRTOF sensor IR transmitter is idle. At step 100, the integrated sensor hub commands the ambient light condition sensitivity settings at the IRTOF sensor to adjust the IRTOF sensor to the sensed ambient light. At step 102, the IRTOF IR transmitter is enabled to reinitiate IRTOF user presence sensing. At step 104 a determination is made of whether the end user is present or absent. If the end user is present with the adjust sensitivity, the process returns to step 90 to continue monitoring for end user presence. If the end user is absent at step 104, the process continues to step 106 to power down the display and perform and other functions associated with an end user absent state.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor disposed in the housing and operable to execute instructions that process information;
   a memory disposed in the housing and interfaced with the processor, the memory operable to store the instructions and the information;
   an embedded controller interfaced with the processor and operable to manage inputs provided from one or more input devices for communication to the processor;
   a display interfaced with the processor and operable to present the information as visual images;
   an ambient light sensor disposed proximate the display and operable to detect ambient light conditions;
   an infrared time of flight sensor disposed in the housing and configured to detect user presence and absence by illuminating an area proximate the display with an infrared source and sensing infrared light reflected by an object to determine a distance to the object; and
   a proximity detection service executing on the processor and interfaced with the infrared time of flight sensor and the ambient light sensor, the proximity detection service operable to disable presentation of visual images at the display in response to an infrared time of flight sensor user absence detection, the proximity detection service further operable to retrieve ambient light conditions from the ambient light sensor to look up infrared time of flight sensitivity levels associated with the ambient light conditions and to communicate the infrared time of flight sensitivity levels to the infrared time of flight sensor for application in sensing distance to the object;
   wherein:
   the ambient light conditions comprise at least ambient light brightness and ambient light color temperature; and
   the proximity detection service looks up the infrared time of flight sensitivity levels from a lookup table stored in non-transitory memory that relates both ambient light brightness and ambient light color temperature to infrared time of flight sensitivity.

2. The information handling system of claim 1 wherein infrared time of flight sensitivity levels apply as an adjustment to infrared time of flight sensitivity settings selected by the infrared time of flight sensor.

3. The information handling system of claim 1 wherein the infrared time of flight sensitivity levels apply as the infrared time of flight setting used at the infrared time of flight sensor.

4. The information handling system of claim 1 wherein the proximity detection service maintains the presentation of visual images at the display in response to a user absence detection when the ambient light color temperature exceeds a predetermined value.

5. The information handling system of claim 1 wherein the proximity detection service maintains the presentation of visual images at the display in response to a user absence detection when the ambient light brightness exceeds a predetermined value.

6. The information handling system of claim 1 wherein the proximity detection service commands the infrared time of flight sensor to select infrared time of flight sensitivity levels autonomously when the ambient light color temperatures falls below a predetermined value.

7. The information handling system of claim 1 wherein the proximity detection service commands the infrared time of flight sensor to select infrared time of flight sensitivity levels autonomously when the ambient light brightness falls below a predetermined value.

8. The information handling system of claim 1 wherein the proximity detection service comprises logic executing in an integrated sensor hub of the processor.

9. A method for detecting user absence at an information handling system, the method comprising:
   monitoring proximate a display of the information handling system with an infrared time of flight sensor to detect user presence and user absence states;
   monitoring ambient light conditions proximate the display with an ambient light sensor to modify presentation of visual images at the display based upon the ambient light conditions;
   applying the ambient light conditions to configure the infrared time of flight sensor sensitivity, by reference to a lookup table that associates the ambient light conditions with infrared time of flight sensor sensitivity settings;
   detecting the user absence state with the infrared time of flight sensor; and
   in response to the detecting, disabling presentation of visual images at the display.

10. The method of claim 9 wherein the applying the ambient light conditions further comprises commanding from a central processing unit of the information handling system to the infrared time of flight sensor sensitivity settings for application at the time of flight sensor.

11. The method of claim 10 wherein the applying the ambient light conditions further comprises commanding from an embedded controller of the information handling system to the infrared time of flight sensor sensitivity settings for application at the time of flight sensor.

12. The method of claim 9 wherein the applying further comprises:
   comparing a brightness detected by the ambient light sensor with the lookup table of infrared time of flight sensor sensitivity settings;
   communicating the infrared time of flight sensor setting associated with the brightness by the comparing to the infrared time of flight sensor; and
   applying the infrared time of flight sensitivity at the infrared time of flight sensor to detect user presence and user absence.

13. The method of claim 9 wherein the applying further comprises:
   comparing a color temperature detected by the ambient light sensor with the lookup table of infrared time of flight sensor sensitivity settings;

communicating the infrared time of flight sensor setting associated with the color temperature by the comparing to the infrared time of flight sensor; and applying the infrared time of flight sensitivity at the infrared time of flight sensor to detect user presence and user absence.

14. The method of claim 9 further comprising:

determining that the ambient light conditions exceed a threshold; and in response to the determining, disabling application of the time of flight sensor user presence and user absence states associated with presenting visual images at the display.

15. A system for detecting end user presence and absence at an information handling system, the system comprising:

an infrared time of flight sensor operable to illuminate an object with an infrared light source, to detect reflections from the object of the infrared illumination with a configurable sensitivity, and to determine a distance to the object based on the reflections;

an ambient light sensor operable to detect ambient light conditions;

a sensor controller interfaced with the infrared time of flight sensor and the ambient light sensor, the sensor controller operable to retrieve the ambient conditions and to command the configurable sensitivity; and a non-transient memory interfaced with the sensor controller and storing:

a lookup table of plural ambient conditions each related to one of plural configurable sensitivities; and instructions that when executed on the sensor controller applies ambient conditions received from the ambient light sensor to determine the configurable sensitivity related by the lookup table and commands the infrared time of flight sensor to apply the related configurable sensitivity, the instructions further reporting end user absence and presence to the information handling system based upon distances sensed by the infrared time of flight sensor.

16. The system of claim 15 wherein the instructions when executed further:

detects a first threshold ambient light condition; and in response to the first threshold ambient light condition, disables end user absence detection reports from the sensor controller.

17. The system of claim 15 wherein the instructions when executed further:

detects a second threshold ambient light condition; and in response to the second threshold ambient light condition, commands the infrared time of flight sensor to autonomously select the configurable sensitivity.

18. The system of claim 15 wherein the instructions when executed further:

disables the infrared time of flight sensor from illumination of infrared light;

receive from the ambient light sensor ambient light conditions sensed with the infrared time of flight sensor disabled from illumination; and enables the infrared time of flight sensor for illumination of infrared light after applying the configurable sensitivity based upon the ambient light conditions sensed with the illumination of infrared light disabled.

19. The system of claim 15 wherein the ambient light conditions include both brightness and color temperature.

* * * * *